Aug. 29, 1944.    G. CAROLIN    2,357,082
MEMORIZER
Filed April 9, 1942    2 Sheets-Sheet 1
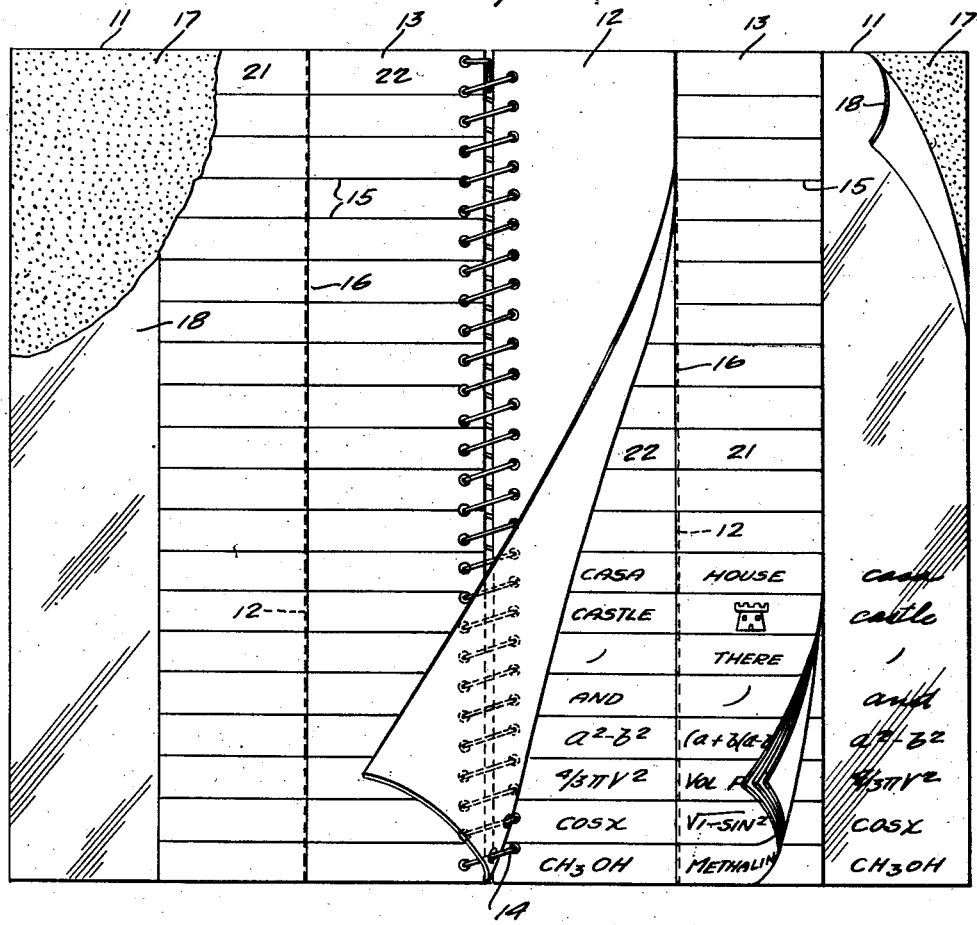
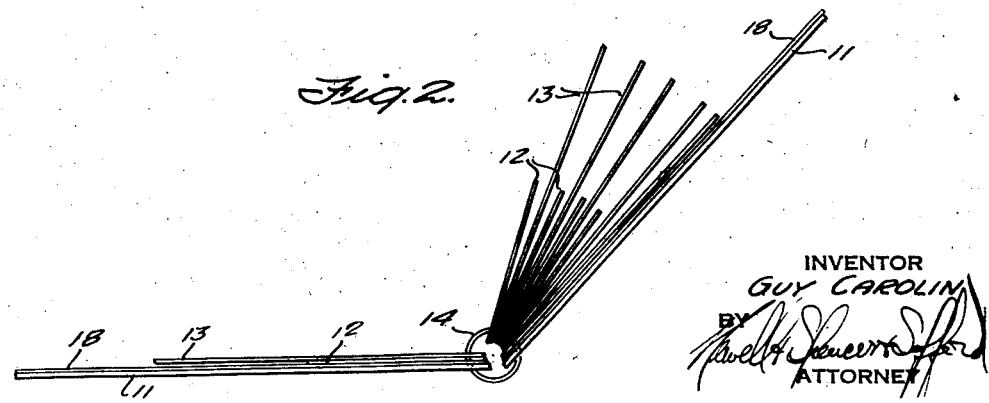
INVENTOR
GUY CAROLIN
BY
ATTORNEY

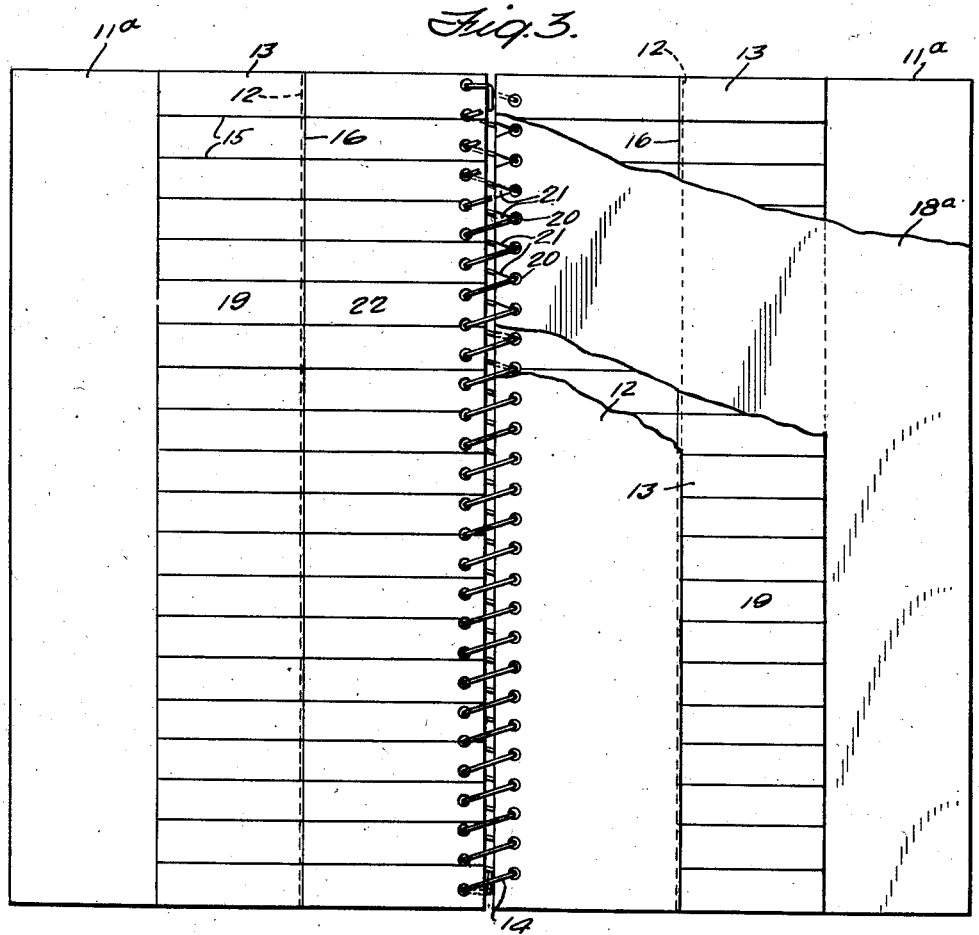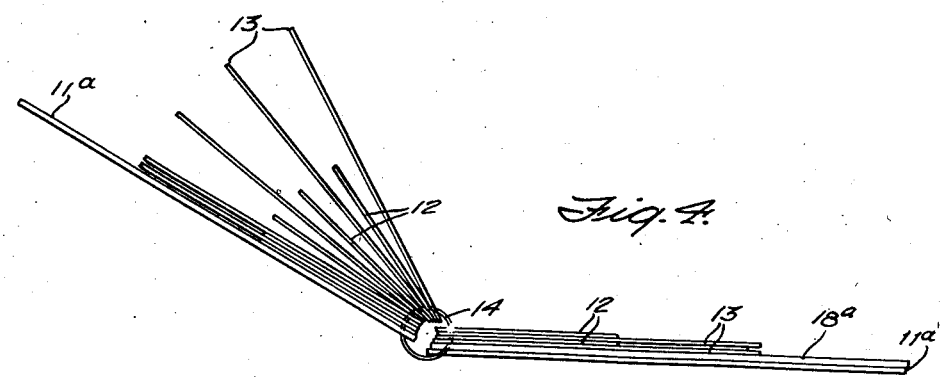

Patented Aug. 29, 1944

2,357,082

UNITED STATES PATENT OFFICE 2,357,082

MEMORIZER

Guy Carolin, New York, N. Y.

Application April 9, 1942, Serial No. 438,242

6 Claims. (Cl. 35—22)

This invention relates to an educational device and particularly to a device for use as an aid in memorizing and is an improvement upon the device described and claimed in my prior Patent No. 2,234,075.

It is an object of the invention to improve the efficiency of utilization of the paper in a memorizer book of the type set forth in my prior patent and in particular to provide for the practicing by writing out of the words or symbols to be learned as many times as may be necessary for the particular list being studied without the necessity of providing excess paper which may be wasted when a list is learned with less difficulty.

It is also an object of the invention to provide for the use of the backs of the sheets as well as the upper face.

With these objects in view my present invention contemplates the use of a practice sheet or tablet in common for all of the pairs of listing and masking sheets on which the words or symbols to be learned and the key symbols are listed, the writing surface of which is abstersible, that is to say, it is capable of being renewed without substantial deterioration by a simple wiping off or pulling away of the adherent marking material.

Although I am showing in the accompanying drawings and describing below certain specific examples of my invention and its application to practical use and indicating certain modifications and alternatives, it should be understood that these are not intended to be exhaustive nor limiting of the invention. On the contrary, I am giving these as illustrations in order fully to acquaint others skilled in the art with my invention and the principles thereof and a suitable manner of its application to practical use, so that others skilled in the art may be enabled to modify the invention and to adapt it and apply it in numerous forms as may be best suited to the requirements of a particular use.

In the accompanying drawings:

Figure 1 is a plan view of a preferred embodiment of my invention with the corners of the pages turned up to better show the structure of the book;

Figure 2 is an end view of the same book partly opened;

Figure 3 is a plan view partly broken away of an alternative embodiment of my invention, opened for insertion of the practice writing sheet and with the listing and masking sheets in position for use; and Figure 4 is an end view of the same book partly opened.

In these drawings like elements are indicated by like numerals, identical parts in the different figures being indicated by the same numbers and parts serving the same or similar functions, but having differences of structure or design, being identified by like numbers with the addition of the letter $a$ with respect to such parts shown in Figures 3 and 4.

Referring first to Figures 1 and 2, the book there shown consists of covers 11, of a special character to be described below, a masking sheet 12 and listing sheets 13, all hingedly bound together advantageously by a ring-type binder, in this instance shown as a spiral wire 14 engaged in holes in the several sheets.

The listing sheets 13 are preferably provided with lines 15, marking off rows of spaces in which the word or symbol to be learned and the key words or symbol are listed side by side in two columns. These columns may preferably be divided by a line 16 positioned so that the one column defined by the line is substantially coextensive with the area covered by the masking sheet 12.

The covers 11 extend beyond the edges of the listing sheets 13 and present a writing space laterally beyond the ends of the rows which in effect gives a third column for the practice writing of the answers to the problems, e. g., the words or symbols, identified by the keys in the exposed column of the sheet 13.

Each of the covers 11 is provided with an abstersible recording surface on its inner face at least in the area which projects beyond the listing sheets. Any of the well known devices for this purpose may be used. In the drawings, I have shown in Figure 1 a common device consisting of a dark semi-adhesive coating 17 on one side of the cardboard cover and a translucent, e. g., a frosted film 18. When the film is laid over the base and written upon with a stylus or pencil a local adhesion between the two is caused along the lines where the stylus or pencil has pressed and in this line the dark or contrasting color of the base shows sharply through the translucent film in contrast to the areas wherein the film is not pressed into contact and where, therefore, light is reflected from the under surface of the film.

In Figures 3 and 4, instead of this type of abstersible recording sheet, I have shown one (18a) of the slate tablet or blackboard type. These also may be readily rubbed to obliterate the markings and leave the tablet in condition for a new writing. Both natural and synthetic "slates" and blackboards for this purpose are well known and may be used in, but are not my present invention.

In Figures 3 and 4, the abstersible recording sheet is not permanently bound in the book, as is the case in Figures 1 and 2, but instead is removable so that it may be inserted under any of the listing sheets and may be used with either the front or the back of the sheets so that the capacity of the book may in this way be doubled as compared with one in which only one side of the sheet is used. In the example shown, the edge of the sheet 18a is slotted with slots 20 enlarged at their inner ends and having flaring mouths 21 flaring from a narrow throat so as to permit ready engagement and removal from the binder ring member 14 but nevertheless to hold the sheet 18a positioned between any of the other sheets as desired.

In the use of these devices for memorizing, the brief statements, words or symbols identifying the problem are listed in the successive spaces of the exposed column 21 on the listing sheets 13 and opposite these in the column 22 which is exposed only by turning back the masked sheet 12 the answers to the problems are written in the aligned spaces of the same row. Thus, in the first example shown, an English word is written in the exposed column 21, the counterpart in a foreign language being studied is written in the left-hand column where it will be covered during practice by the masking sheet 12. Below this in the same column is shown how spelling may be studied by placing a symbol in the exposed column to suggest a word, the answer in the column 22 being in this case, of course, the word with the correct spelling. Farther down, an English word in the column 21 has beside it in the same row but in the column 22 the proper Gregg form, thus illustrating the use of the device for studying short-hand. Below this is another arrangement of short-hand outline and English word in the reverse order as would be used for practice in reading shorthand. The next illustration is one from algebra, and below these examples from geometry, trigonometry and chemistry.

Whatever the words and symbols used may be, once they have been written into the columns 21, 22 the masking sheet 12 is swung over so as to cover the column 22 and then the student writes on the practice writing sheet 18 or 18a opposite each of the rows, the word or other answer to each of the problems identified in the spaces of the column 21, taking care to write only those of which he is sure so as not to fix in his mind any errors. Any of which he is not sure he leaves blank and then throwing back the masking sheet 12 he copies with close attention the correct answers opposite the symbols of the problems of which he was not able to give the correct answers. The answers which were written in the belief that they were correct are then carefully compared with the answers in the column 22, and any which are incorrect are checked in column 22. The writing is then obliterated from the practice sheet 18 or 18a and the answers which have been checked as wrong are then carefully copied from the answer column 22 to the practice sheet 18 or 18a, paying close attention to the symbol at the same time so that the answer and symbol become associated and the answer becomes firmly impressed upon the mind by writing it correctly. When this is completed the writing is again obliterated from the practice sheet 18 or 18a, the masking sheet 12 is again swung over the column 22 and the procedure is repeated until the student is able to write without mistake the answers to all of the problems presented.

The writing is then obliterated again from the practice sheet 18 or 18a, the student turns the pages 12 and 13 to expose a new listing sheet 13 and additional problems and symbols are copied onto it, paying close attention to the answer and the symbols as they are written one after the other in adjacent spaces of the same row, and thus correctly fixing in association the problem and the answer. The entire procedure is then repeated for these problems and answers and so on through the book. When all the upper faces of the pages in the book have been used, it may be turned over and the backs of the pages may then be used in precisely the same way using the front cover 11 as the practice sheet, if the arrangement shown in Figure 1 is used, instead of the back cover as before.

With the arrangement shown in Figures 3 and 4 the same procedures are followed excepting that in this case the practice sheet is in the form of a stiff tablet which can be fitted into or withdrawn from between each pair of sheets in turn and is formed with slots in its edge, for example, as shown in Figure 3, to register with the rings of the binding. Thus the tablet will be held securely in alignment while it is in use.

In this case, instead of using an ordinary pencil the writing will be done with a special stylus or crayon and obliterated with a rag or special eraser. When it is desired to use the back of the pages in this case it is obviously only necessary to turn over the book and the tablet and to use the tablet under the desired pages.

What I claim is:

1. A practice and testing book which comprises a binding, a sheet having lines defining rows of spaces extending across columns, said columns being adapted for inscription of problems and answers respectively, a mask sheet bound with said first-named sheet and hingedly positioned to cover and to be turned away from one of the columns of the first-named sheet, and an abstersible recording sheet positioned beneath said first-named sheet and projecting laterally beyond the rows thereof temporarily to receive written answers and to be cleared of writing repeatedly.

2. A practice and testing book as defined in claim 1, in which the abstersible recording sheet is composed of a stiff base having a dark surface and a flexible translucent writing sheet, one of said sheets having a semi-adhesive surface facing the other whereby local pressure, as of a stylus or pencil point, will cause local temporary adhesion between the writing sheet and the base.

3. A practice and testing book which comprises a plurality of pairs of sheets, one sheet of each pair having lines defining rows of spaces extending across columns, said columns being adapted for inscription of problems and answers respectively, and the other being a mask sheet hingedly positioned to cover one of the columns of the first-named sheet, a stiff abstersible recording sheet positioned beneath all of said pairs of sheets whereby to serve as a cover therefor and projecting laterally beyond the rows on the first-named sheets whereby to receive temporarily answers written in alignment with said rows and to be cleared repeatedly for further practice, and binding means holding said several sheets hingedly in their respective relations.

4. A practice and testing book as defined in claim 3, in which each of the first-named sheets has on both sides thereof said lines defining rows, and a second abstersible recording sheet is bound on top of said other sheets whereby to serve as a top cover and projecting laterally beyond the rows of the first-named sheets with its abstersible recording side faced inwardly toward said other sheets to receive temporarily answers written in alignment with said rows on the backs of said first-named sheets and to be cleared repeatedly for further practice.

5. A practice and testing book which comprises a plurality of pairs of sheets piled one on another, one sheet of each pair having lines defining rows of spaces extending across columns, said columns being adapted for inscription of problems and answers respectively, the other of each pair being a narrower mask sheet hingedly positioned to cover one of the columns of the first-named sheet, binding means hingedly binding said sheets in said relation and leaving the edge adjacent the uncovered column free for insertion of a practice writing sheet projecting beyond the ends of said rows to receive written answers in alignment with said rows, and a practice writing tablet adapted to be inserted under a pair of sheets with a portion thus projecting having an abstersible writing surface.

6. A practice and testing book as defined in claim 5, in which the binding means is comprised of a plurality of ring-shaped members passing through holes in the sheets of said file and the practice writing sheet is a stiff abstersible recording sheet slotted from one edge in register with said holes, whereby to engage and be positioned by said ring-shaped members.

GUY CAROLIN.